United States Patent [19]  [11] 4,352,683
Vogel  [45] Oct. 5, 1982

[54] APPARATUS FOR VENTING AND DEAERATING FROM A LIQUID CIRCUIT

[75] Inventor: Hans Vogel, Nuremburg, Fed. Rep. of Germany

[73] Assignee: MAN Maschinenfabrik Augsburg-Nuernberg AG, Nuremberg, Fed. Rep. of Germany

[21] Appl. No.: 226,795

[22] Filed: Jan. 21, 1981

[30] Foreign Application Priority Data

Jan. 25, 1980 [DE] Fed. Rep. of Germany ....... 3002578

[51] Int. Cl.$^3$ ............................................. B01D 19/00
[52] U.S. Cl. ......................................... 55/192; 55/201
[58] Field of Search ................. 55/178, 186, 187, 192, 55/193, 201, 202

[56] References Cited

U.S. PATENT DOCUMENTS 3,130,022  4/1964  Clark ...................................... 55/182
3,831,352  8/1974  Parcels ................................... 55/193
4,064,848  12/1977  Pabst ..................................... 53/193

Primary Examiner—John Adee
Attorney, Agent, or Firm—Karl H. Gross

[57] ABSTRACT

An apparatus for venting and deaerating a liquid circuit, such as the coolant circuit of an internal combustion engine, has a surge tank with an air-side port and a liquid-side port. Installed in the air-side port is a tube, through one end of which liquid to be deaerated is admitted at a certain velocity. The tube has a longitudinally extending lateral slot through which the admitted liquid is discharged; opposite the slot is located a baffle onto which the discharged liquid impinges over a large surface area. This causes even small air bubbles to be liberated from the liquid so as to remain in the air-side part, whereas the deaerated liquid runs off the baffle and into the liquid-side part of the surge tank.

9 Claims, 2 Drawing Figures

APPARATUS FOR VENTING AND DEAERATING FROM A LIQUID CIRCUIT

BACKGROUND OF THE INVENTION

The invention relates to apparatus for venting and deaerating a liquid circuit, typically the coolant circuit of internal combustion engines including at least a pump and a surge tank.

Liquid circuits, especially coolant circuits, frequently present a great problem in maintaining the complete system free from air, gas or vapour bubbles which are caused predominantly by turbulence, vapour formation or simply by air being drawn in. Such void formation not only affects the cooling action but causes above all cavitation and corrosion which are liable to result in early destruction of the complete fluid circuit. Various attempts have been made to overcome this drawback, but success has only been partial in as only much as coarse deaeration has been achieved.

SUMMARY OF THE INVENTION

This is the starting point of the present invention which has for its object to provide apparatus of the type initially described whereby reliable microdeaeration is possible of a liquid contained in a circuit.

According to the invention, this object is attained by providing in the air-side part of the surge tank means for a velocity change or depressurizing of the liquid entering from the liquid circuit and by forming these means with a wide discharge opening designed and arranged in a manner that even small air and/or gas bubbles will be separated out upwards into the air-side part while providing a baffle for discharging the liquid also on a wide base with a greatly reduced velocity and energy.

In other words, the invention relies on the principle of velocity change in liquids whereby the suspended portions of the air existing in the liquid are systematically separated out and, consequently, a purer liquid flows out of the apparatus into the liquid circuit. As soon as the liquid has passed the apparatus a number of times it will be practically free from air.

The surge tank is specially adapted for accommodating the deaerating apparatus because, apart from the liquid, it does contain a proportion of air which fills the expansion space and because this air is subjected to the initial system pressure.

To start with, means are provided for the liquid which, say, in the coolant circuit of an internal combustion engine enters with a high velocity and energy such means provide a velocity change and pressure reduction respectively which, depending on existing conditions, may result in a velocity reduction by a factor of about 7. These means are formed with a wide discharge opening through which the partially depressurized liquid is transferred into the expansion space with additional pressure reduction taking place, and in as wide as possible a stream. Here, even small air or vapour bubbles will separate out and rise upwards into the air-side part of the surge tank. The liquid in turn flows without any foaming against a baffle by means of which it is discharged into the liquid-side part of the surge tank.

In detail, it is proposed according to the invention that the means for depressurizing the liquid be formed as a horizontally arranged depressurizing tube which is directly closed at both ends, and that, inserted through one end face of the depressurizing tube, there is a return pipe which is closed at its end and which has a substantially smaller diameter to conduct the liquid from the circuit into the depressurizing tube, the return pipe being formed with deflection ports extending inside the depressurizing tube in a radial direction. Thus, the liquid discharged from the return pipe at a high velocity and with a high energy is initially deflected by the deflection ports through an angle of about 90° before entering the expansion space where it travels as far as its the rear end thereof.

The outlet opening according to the invention is formed by a discharge slot provided in the side of, and extending substantially the full length of, the depressurizing tube, the free cross-sectional area and the volume of the depressurizing tube being proportioned so that the pressure of the liquid at the discharge opening substantially corresponds to the pressure in the surge tank and, consequently, the system pressure. An essential feature of the invention is that the baffle referred to is arranged at an accurately predetermined distance in front of the discharge opening depending on the specific design of the complete system and is immersed in the water even at low water level.

As a further development of the invention, it is proposed that a weir-type guide member is closely attached at the underside of the depressurizing tube to slope downwards towards the baffle and that, between the end of the guide member and the baffle there remains a free slot which is proportioned so that, at rated flow, the liquid passes into the liquid-side part of the surge tank without admixture of air and without stagnation over the guide member.

In other words, the guide member causes part of the space existing over it to be filled with liquid whereby a weir-type discharge occurs over a wide base. Further laminar discharge on the baffle into the water-side part of the surge tank occurs without foaming so that an effectively deaerated and/or degassed liquid is available for continued circulation. It should be mentioned in this context that the apparatus readily produces a reduction of coolant velocity by a factor of about 7.2 (pressure ratio approx. 52 times), so that inflow and mixing at the surface of the coolant is attained in the laminar flow regime.

Depending on specific conditions, the air separation efficiency of the apparatus is between 3 and 10%.

Finally, it remains to be pointed out that the baffle may conveniently be formed as the side wall of the surge tank, that at least one drain hole is provided at the lowest point of the depressurizing tube, and that in and/or ahead of the outlet pipe from the surge tank a vane is provided to prevent eddies forming. The latter feature enables the apparatus according to the invention also to be fully taken advantage of under conditions of decreasing water level in the surge tank because it prevents air from being drawn in through the outlet pipe.

Reference is made for details of the invention to the following description of a typical embodiment of the invention illustrated in the drawings.

DESCRIPTION OF PREFERRED EMBODIMENTS

Figure 1:
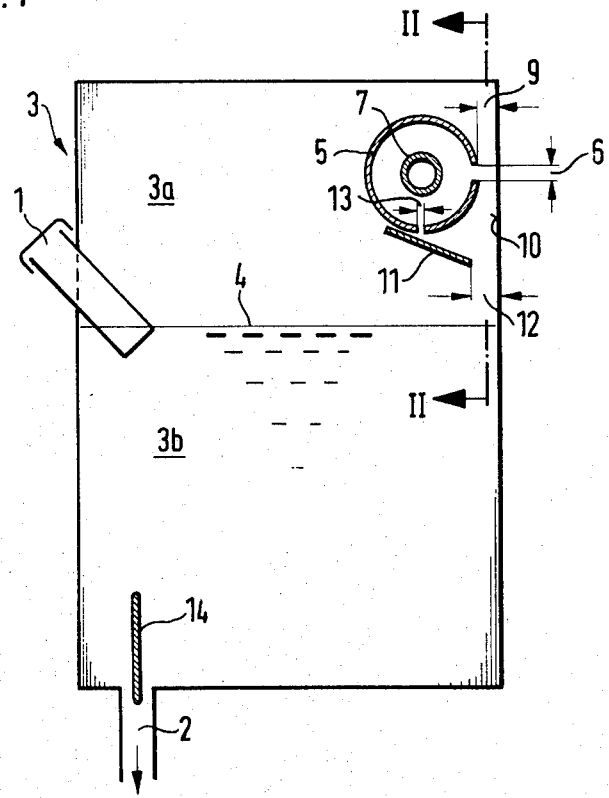
FIG. 1 is a strictly schematic longitudinal section through a surge tank with apparatus according to the invention.

FIG. 1 schematically shows a surge tank 3, also called a header tank, provided with a filler neck and pressure control valve 1 and an outlet pipe 2 for a coolant circuit of the type used, for instance, for internal combustion engines. The interior of the surge tank 3 is divided into an air-side part 3a serving as an expansion space and a liquid-side part 3b where the liquid level 4 varies.

Figure 2:
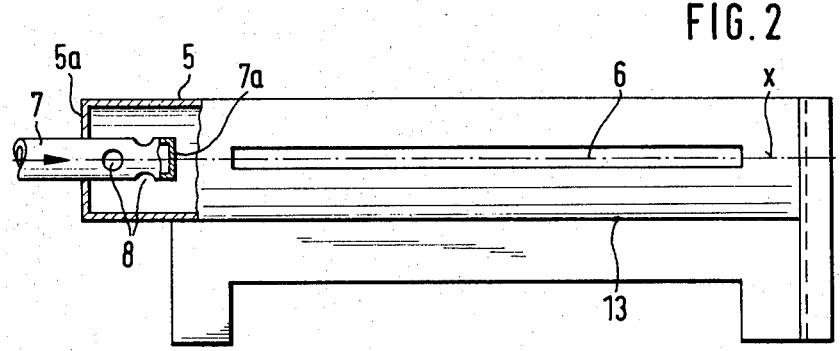
FIG. 2 is a section along the line II—II in FIG. 1.

It can be seen from FIGS. 1 and 2 that, arranged horizontally in the air-side part 3a, there is a depressurizing tube 5 which is tightly closed at its ends 5a and is formed at one side at the level of its longitudinal centerline x with a discharge slot 6 extending substantially over its full length. Passing through one end 5a of the depressurizing tube 5 is an inlet pipe 7 having a substantially smaller diameter and its end 7a inside the depressurizing tube 5 tightly closed, with a plurality of radial deflection ports 8 being formed in this end. The liquid returning from the coolant system at a high velocity and with a high amount of energy thus enters the depressurizing tube 5 in a radial direction.

Arranged at an accurately predetermined distance 9 ahead of the discharge slot 6 is a baffle 10 which extends down below the lowest liquid level 4 and, in the present instance, is formed by a wall of the surge tank 3. The distance 9 of the baffle 10 from the discharge slot 6 is selected so that a substantially uniform discharge occurs over the full length of the discharge slot 6.

Closely attached to the underside of the depressurizing tube 5 is a guide member 11 which slopes downwards towards the baffle 10. Between the end of the guide member 11 and the baffle 10 there remains a gap 12 which is proportioned so that the guide member 11 forms a weir over which the liquid passes over a wide surface at greatly reduced velocity and greatly reduced energy to the baffle 10 where it flows downwards without foaming. Any air, gas or vapour bubbles will separate from the liquid as it is discharged through the slot 6 to rise upwards and to remain in the air-side part 3a of the surge tank 3.

At the lowest point of the depressurizing tube 5, there is a small drain hole 13 allowing liquid flowing out from it to pass also over the guide member 11. The guide member 11 also prevents any drops liable to cause foaming from forming on the depressurizing tube 5 because these will also be discharged over the baffle 10.

Finally, a vane 14 is provided ahead of the outlet pipe 2 of the surge tank 3 which, when the liquid level 4 decreases, prevents air from being drawn into the circuit by the water eddy which normally tends to form.

I claim:

1. Apparatus for degassing a liquid circuit, particularly the cooling circuit of an internal combustion engine, comprising a surge tank having a lower liquid-side part and an upper gas-side part;
inlet means for admitting a gas-containing liquid into said surge tank under pressure;
outlet means for discharging degassed liquid from said surge tank; and
means for depressurizing and degassing the admitted liquid, comprising an at least generally horizontal expansion tube of predetermined diameter and having closed ends and a longitudinally extending large-area outlet, a liquid-inlet pipe of a diameter smaller than said predetermined diameter and having a closed but radially ported end portion extending through one of said ends and located within said tube and a baffle opposite to and spaced from said large-area outlet so that when gas-containing liquid admitted via said inlet pipe is discharged from said large-area outlet over the relatively large area of the outlet and impinges upon said baffle, even small gas bubbles will be liberated from the liquid to rise upwards in said gas-side port whereas the now degassed liquid is depressurized prior to its run-off over a surface of the baffle and into said liquid-side port.

2. Apparatus as defined in claim 1, wherein said large-area outlet is a lateral slot formed in said tube and extending over at least a major portion of the tube length.

3. Apparatus as defined in claim 1, wherein the free cross-sectional area of said large-area outlet and the volume of said expansion tube are proportional to one another, so that the pressure of the liquid at said large-area outlet substantially corresponds to the pressure in said surge tank.

4. Apparatus as defined in claim 2, wherein said baffle is spaced from said outlet slot by a predetermined distance, said baffle having a lower end portion which extends into said liquid-side port to a distance below the lowest anticipated liquid level therein.

5. Apparatus as defined in claim 2, said tube having a lower side; and further comprising an overflow-type guide member tightly mounted at said lower side and sloping from there towards said baffle, said guide member having a free edge defining with said baffle an unobstructed gap proportioned so that at rated flow the liquid is discharged into said gas-side port without stagnation and without entrainment of gas.

6. Apparatus as defined in claim 1, wherein said baffle constitutes at least part of a side wall of said surge tank.

7. Apparatus as defined in claim 5, said tube having in said lower side at the lowest point thereof at least one drain hole for discharging liquid onto said guide member.

8. Apparatus as defined in claim 1; and further comprising means for preventing the formation of eddies in said outlet means.

9. Apparatus as defined in claim 8, said preventing means comprising a fin mounted at least proximal to said outlet means.

* * * * *